United States Patent [19]

Hagenes

[11] Patent Number: 5,646,342
[45] Date of Patent: Jul. 8, 1997

[54] METHOD OF LOCATING HYDROCARBON RESERVES

[75] Inventor: Odd Bjarte Hagenes, Bekkjarvik, Norway

[73] Assignee: Schlumberger Technology Corporation, Sugar Land, Tex.

[21] Appl. No.: 510,951

[22] Filed: Jul. 31, 1995

Related U.S. Application Data

[63] Continuation of Ser. No. 36,610, Mar. 24, 1993, abandoned.

[30] Foreign Application Priority Data

Mar. 27, 1992 [GB] United Kingdom ............. 9206676

[51] Int. Cl.$^6$ ............. E21B 47/00; G01V 1/00; G01V 1/34
[52] U.S. Cl. ............. 73/152.02; 73/152.58; 73/620; 175/40; 175/50; 166/250.16; 364/420; 364/422; 367/25
[58] Field of Search ............. 73/151, 154, 155, 73/784, 152.02, 152.47, 152.58, 620; 436/27, 29, 25; 175/40, 45, 50; 367/25, 53, 47, 61, 62; 166/250; 364/420, 421, 422

[56] References Cited

U.S. PATENT DOCUMENTS

| | | | |
|---|---|---|---|
| 3,559,737 | 2/1971 | Ralston et al. | 166/281 |
| 4,369,497 | 1/1983 | Poupon et al. | 364/422 |
| 4,414,656 | 11/1983 | Hepp | 367/25 |
| 4,779,237 | 10/1988 | Bodine | 367/47 |
| 4,821,242 | 4/1989 | Hennington | 367/53 |
| 4,957,172 | 9/1990 | Patton et al. | 175/61 |
| 5,001,634 | 3/1991 | Nordin | 73/382 |
| 5,103,920 | 4/1992 | Patton | 175/45 |
| 5,120,160 | 6/1992 | Schwengel | 405/128 |
| 5,410,252 | 4/1995 | Potter et al. | 324/345 |

Primary Examiner—Hezron E. Williams
Assistant Examiner—J. David Wiggins
Attorney, Agent, or Firm—Peter Y. Lee; Wayne I. Kanak

[57] ABSTRACT

A method of locating hydrocarbon reserves comprising: selecting on the basis of a hydrocarbon hypothesis from a region of interest below the surface of the earth patches having probabilities of containing hydrocarbon reserves greater than a predetermined probability; defining from structural data a respective structural closure for each of the patches, each structural closure comprising an area capable of enclosing a hydrocarbon reserve and having a perimeter of constant depth substantially equal to the deepest point of the patch; determining a measure of the geometrical match between each patch and the respective structural closure; and selecting each patch having a measure of the geometrical match exceeding a predetermined measure. Particular geometrical matching methods include those relating to the height, area, volume and perimeter outline of the potential reserves.

24 Claims, 12 Drawing Sheets

METHOD OF LOCATING HYDROCARBON RESERVES

This is a continuation of application Ser. No. 08/036,610, filed Mar. 24, 1993 now abandoned.

BACKGROUND OF THE INVENTION

Field of the Invention

The present invention relates to a method of locating hydrocarbon reserves.

SUMMARY OF THE INVENTION

According to the invention, there is provided a method of locating hydrocarbon reserves, comprising: selecting on the basis of a hydrocarbon hypothesis from a region of interest below the surface of the earth patches having probabilities of containing hydrocarbon reserves greater than a predetermined probability; defining from structural data on the region of interest a respective structural closure for each of the patches, each structural closure comprising an area capable of enclosing a hydrocarbon reserve and having a perimeter of constant depth substantially equal to the deepest point of the patch; determining a measure of the geometrical match between each patch and the respective structural closure; and selecting each patch having a measure of the geometrical match exceeding a predetermined measure.

The hydrocarbon hypothesis of the region may be formulated in various different ways but, in each case, represents at each point of the region of interest the probability that a hydrocarbon reserve exists at that point. Thus, the hydrocarbon hypothesis may be presented in the form of a contour map in which each contour joins together points of equal probability. The hydrocarbon hypothesis may, for instance, be derived from seismic reflectivity measurements so as to define areas of relatively high seismic reflectivity, which may correspond to boundaries between water and gas or the like. This may be derived, for instance, from so-called "bright spots" detected by high amplitude reflections, or by using "amplitude versus offset" (AVO) techniques. Alternatively or additionally, the hydrocarbon hypothesis may be derived from seismic data indicating the relative porosities of different areas. For instance, areas of relatively high porosity may have space within the rock matrix for containing hydrocarbon fluid.

A further possibility for the hydrocarbon hypothesis is the random selection of areas of different probabilities. Such a technique may be used to derive from structural seismic data those structures or areas within the region which are capable of containing hydrocarbon reserves. The hydrocarbon hypothesis may be adapted until it matches the structural data so that, in effect, the method extracts from the structural data possible hydrocarbon bearing regions without relying on any other data about the nature and possible content of such areas.

In the case where the region contains a known hydrocarbon reserve, for instance found during drilling exploration, the predetermined probability may be made equal to the probability of the patch corresponding to the known hydrocarbon reserve. Thus, less probable patches may be ignored and only those patches which are as likely or more likely to contain hydrocarbon reserves are selected.

The measure of the geometrical match may be determined from: a comparison between the highest point of each patch and the highest point of the respective structural closure; and/or a comparison between the area of each patch and the area of the respective structural closure; and/or a comparison between the volume enclosed by the portion of the structural closure above the patch and the volume enclosed by the respective structural closure; and/or a comparison between the perimeter of the patch and the perimeter of the respective structural closure. For instance, by taking any one of these comparisons or a weighted sum or average of more than one of these comparisons, it is possible to determine the measure of the geometrical match. In the case of a region containing a known hydrocarbon reserve, the predetermined measure may be equal to the measure of the geometrical match for the known hydrocarbon reserve. Thus, less likely patches may be ignored and, for instance, drilling exploration may be directed towards those areas containing patches which offer the best chance of containing hydrocarbon reserves.

BRIEF DESCRIPTION OF THE DRAWINGS

The invention will be further described, by way of example, with reference to the accompanying drawings, in which.

Figure 1:
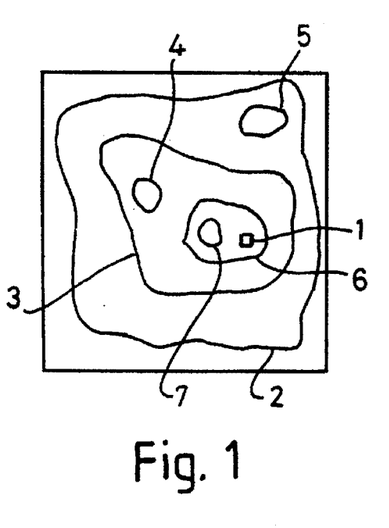
FIG. 1 is a depth contour map illustrating the structure of a region of interest below the surface of the earth.

The region of interest shown in FIG. 1 contains a known hydrocarbon reserve found on the basis of a drilling operation at the location illustrated by the small square 1. The contour map of FIG. 1 represents structural information about the boundaries between rocks of dissimilar material. In particular, the map shows contour lines 2 to 7 representing the depths of a boundary above which is located a layer which is believed to be impervious to hydrocarbons. The contour lines join together the points of equal depth as in conventional contour mapping. Although the contour line depths are not indicated in FIG. 1, the contour 2 is deeper than the contours 3 and 5, which are deeper than the contours 4 and 6 (which are of the same depth as each other). The contour 7 is the shallowest contour line in FIG. 1.

DESCRIPTION OF THE PREFERRED EMBODIMENT

The contour map of FIG. 1 can be derived using conventional seismic exploration and processing techniques, which will not therefore be further described.

Figure 2:
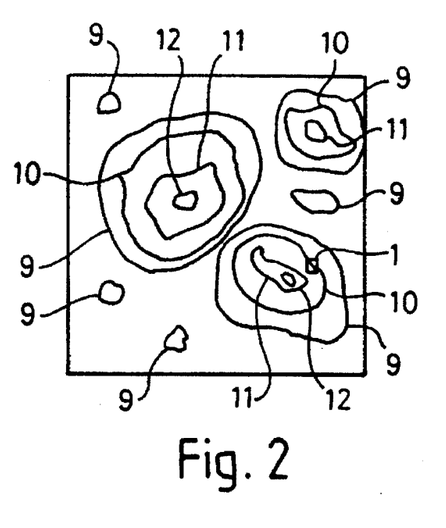
FIG. 2 is a probability contour map of the region shown in FIG. 1 and illustrates hydrocarbon patches of a hydrocarbon hypothesis.

FIG. 2 is a probability contour map of the same region as shown in FIG. 1 with the various contour lines joining together points of equal probability of the presence of hydrocarbon. The contour lines 9 to 12 represent contours of increasing probability.

The map of FIG. 2 is derived from a hydrocarbon hypothesis which is derived independently of the structural map of FIG. 1. The map is divided into individual elements or "pixels" and, based on data obtained from AVO or any of the other techniques described hereinbefore, a probability of the presence of hydrocarbon is ascribed to each pixel. Those pixels having the probabilities represented by the contour lines 10 to 12 are then joined together so as to give the contour map.

Hence, the method of the invention defines a respective structural closure for each of the patches from structural data measured in the region of interest as obtained independently of the hydrocarbon hypothesis map, and representing depth of earth substrate, where the structural substrate encompasses an area enclosing a hydrocarbon reserve and has a perimeter of constant depth substantially equal to the deepest point of such region of interest covered by such patch; where the method permits one to determine a measure of the geometrical difference between each patch and the respective structural closure using geometrical characteristics derived from each of the plurality of graph points used to define said each patch; and then locate possible hydrocarbon reserves by selecting each patch that has a measure (cost) of such geometrical difference property less in value than an operator-specified, predetermined measure (cost).

The known location of the hydrocarbon reserve is again shown at 1 in FIG. 2 and is located on one of the contour lines 10. In order to define a plurality of hydrocarbon patches which are of sufficient interest to merit further investigation, a probability threshold is set equal to the value at the edge of the known reserve 1 which, for purposes of illustration, is assumed to be the probability represented by the contour line 10. The areas of the map of FIG. 2 representing probabilities less than this are ignored whereas those patches representing probabilities greater than or equal to the probability of the contour lines 10 are selected to give the hydrocarbon patches 20 to 22 shown in FIG. 3.

A hydrocarbon hypothesis map is thus prepared for a region of interest below the surface of the earth, wherein such map represents groups of different pluralities of points (pixels) used to define a set of possible hydrocarbon containing patches in the region of interest, for all points lying therewithin the set of patches, the probability of each point (pixel) containing hydrocarbons; so as to permit the determining and selecting of patches each comprising a plurality of graph points having probabilities of containing hydrocarbon reserves greater than a predetermined probability.

Figure 3:
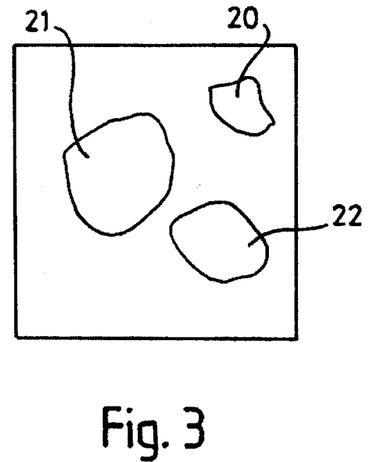
FIG. 3 corresponds to and is derived from FIG. 2 by omitting hydrocarbon patches of relatively low probability.

Structural closures are then determined corresponding to the patches 20 to 22. For each patch, the depth of each pixel is determined from the corresponding point on the contour map of FIG. 1. The deepest pixel is selected and then, by referring to the contour map of FIG. 1, points which have the same depth or which are shallower and which are connected to the deepest pixel of the patch are joined together so as to define the boundary of the structural closure. The extent of the structural closure may also be limited by a sealing seismic fault. Any such fault interpretation is supplied as separate input to this technique.

The geometrical characteristics of the structural closure are then compared with the patch so as to assess how well the structural data match the hydrocarbon hypothesis. In particular, for each patch, a notional "cost" is calculated from four individual "costs" relating to depth matching, area matching, volume matching, and outline matching. Increasing levels of cost represent reducing levels of matching.

The depth cost is determined by comparing the vertical extent of the structural closure with the vertical extent of the portion of the map that is covered by the patch. The highest point of the patch is determined by determining the depth of each pixel of the patch from the depth contour map of FIG. 1 and taking the point of smallest depth. The height of the patch is formed as the difference between the depth of the highest pixel and the depth of the lowest pixel. The height of the corresponding structural closure is similarly determined as the difference between the highest and lowest points of the structural closure. The depth cost is then determined as the difference between the heights of the patch and the structural closure divided by the height of the structural closure.

In order to determine the area cost, the area of the patch and the area of the structural closure are determined, for instance by counting the number of pixels within each. The area of the patch is divided by the area of the structural closure and the square route of this quotient is subtracted from 1 to give the area cost.

The volume cost is determined from the volume of the structural closure and the volume of the patch. The volume of the patch is calculated as follows. The volume above each pixel of the patch is calculated as the difference between the corresponding depth of the depth contour map of FIG. 1 and the depth of the outline of the structural closure. The pixel volumes for all of the pixels of the patch are then summed to form the volume of the patch. A corresponding calculation gives the volume of the structural closure.

The volume of the patch is divided by the volume of the structural closure. The cube route of the quotient is taken and subtracted from 1 to give the volume cost.

The outline cost is determined from the depths of all of the pixels defining the edge of the patch. A mean value is formed as the sum of all of the depths divided by the number of pixels forming the outline. An expected or tolerated variance is supplied as a user-input parameter. The actual variance is then calculated as the sum of the squares of the differences between the actual pixel depths and the mean value, divided by the number of pixels. The actual variance is then divided by the expected variance to form a quotient. The outline cost is then calculated as:

$$1 - e^{-\frac{\sigma^2}{\sigma_e^2}}$$

where $\sigma_e^2$ is the expected variance and $\sigma^2$ is the actual variance.

The total cost of the patch is then defined as half the square route of the sum of the squares of the individual costs.

Figure 4:
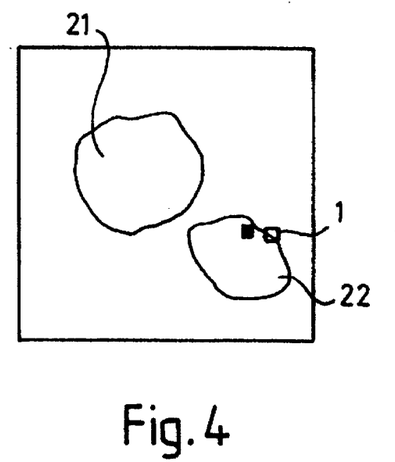
FIG. 4 is a map of the region shown in FIG. 1 illustrating probable hydrocarbon reserves.

The cost of each of the patches 20 to 22 calculated in this way is then compared with a threshold cost. In the example illustrated in the drawings, the cost of the patch 20 is greater than the cost of the patch 22, which is greater than the cost of the patch 21. The threshold cost is, in the example illustrated, chosen as that of the patch 22, containing the known reserve, and each patch of greater cost is ignored. Thus, as shown in FIG. 4, only the patches 21 and 22 are considered further.

The information revealed by this technique may be used in various ways. For instance, further exploration, such as drilling test boreholes, may be performed at the location of each patch which appears promising. Thus, the technique may be used to direct expensive further exploration towards those regions which are most likely to yield useful reserves of hydrocarbons. This in turn enables exploration to be optimised and costs to be reduced. Also, the structural interpretation of a region may be improved as compared with the structural information shown in the depth contour map of FIG. 1 obtained by conventional seismic exploration and processing techniques.

Further, the technique may be used simply to determine the volume enclosed by the structural closure above the hydrocarbon patch. In this case, it may not be necessary to perform the cost calculations and the subsequent steps of the technique.

Figure 5:
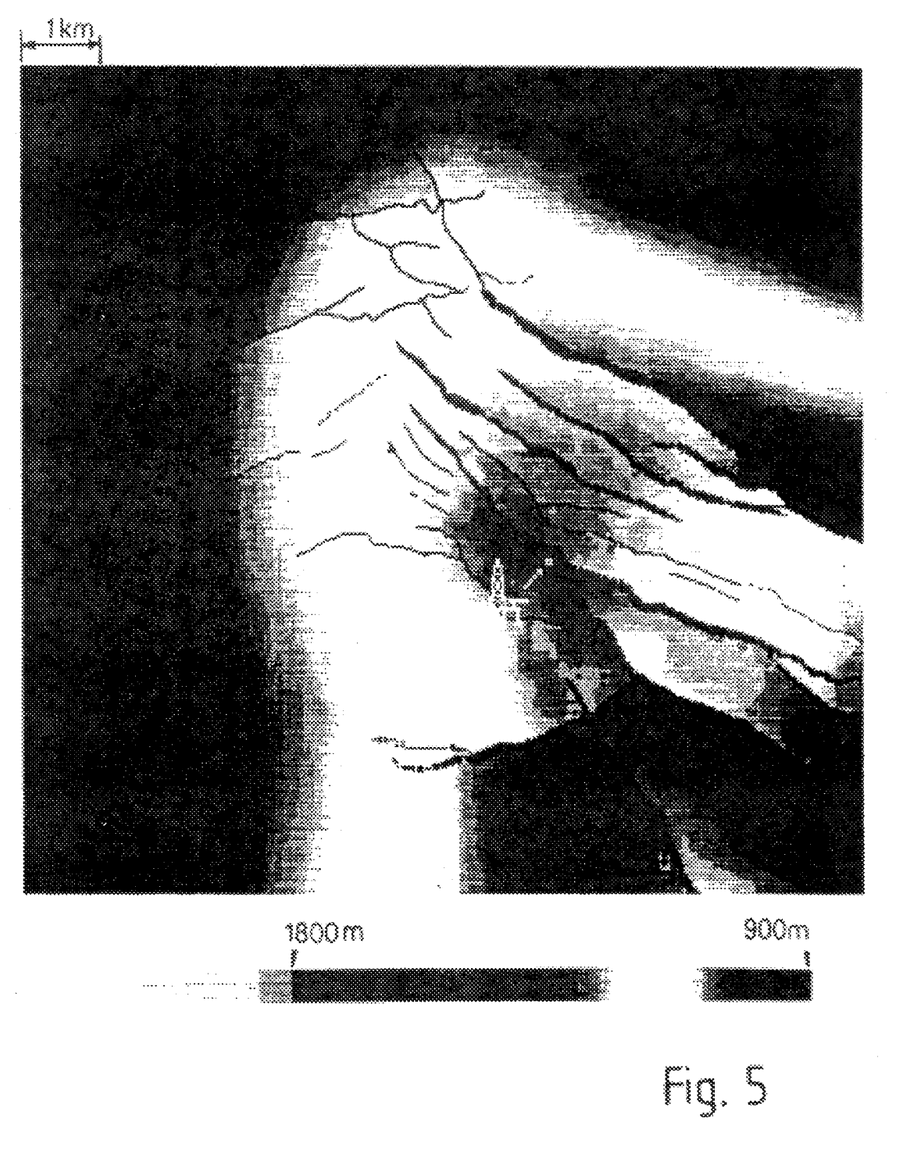
FIG. 5 is a structural map of an actual region with depth being indicated by density of shading.

FIG. 5 is a structural map of an actual region of the earth obtained by conventional seismic exploration and processing techniques. The map shows the boundary between an upper layer which is impervious to hydrocarbons and a lower adjoining layer. The depth of the boundary is indicated by the density of shading and varies between 900 and 1,800 meters in accordance with the scale shown in the bottom right hand corner. The clear lines represent faults which are present in this region.

Figure 6:
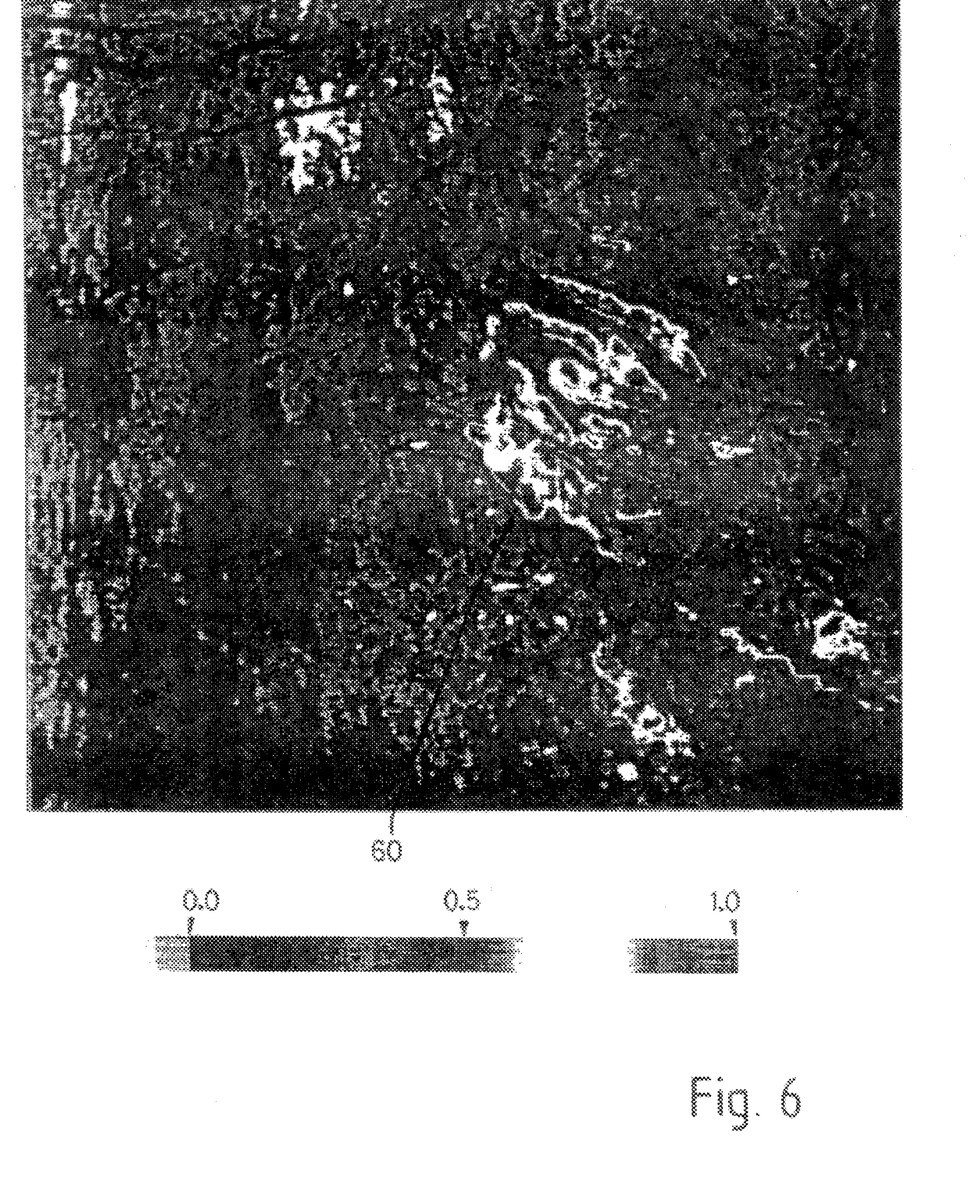
FIG. 6 is a probability map of the region shown in FIG. 5 with probability being indicated by density of shading to illustrate hydrocarbon patches of an actual hydrocarbon hypothesis.

FIG. 6 illustrates a hydrocarbon hypothesis of the same region in the form of a map where the probability of the presence of hydrocarbons is indicated by the density of shading. The probability varies from zero to one in accordance with the scale given at the bottom right hand corner. The hydrocarbon hypothesis may have been obtained by any of the techniques described hereinbefore. A known hydrocarbon reserve exists at the region 60.

Figure 7:
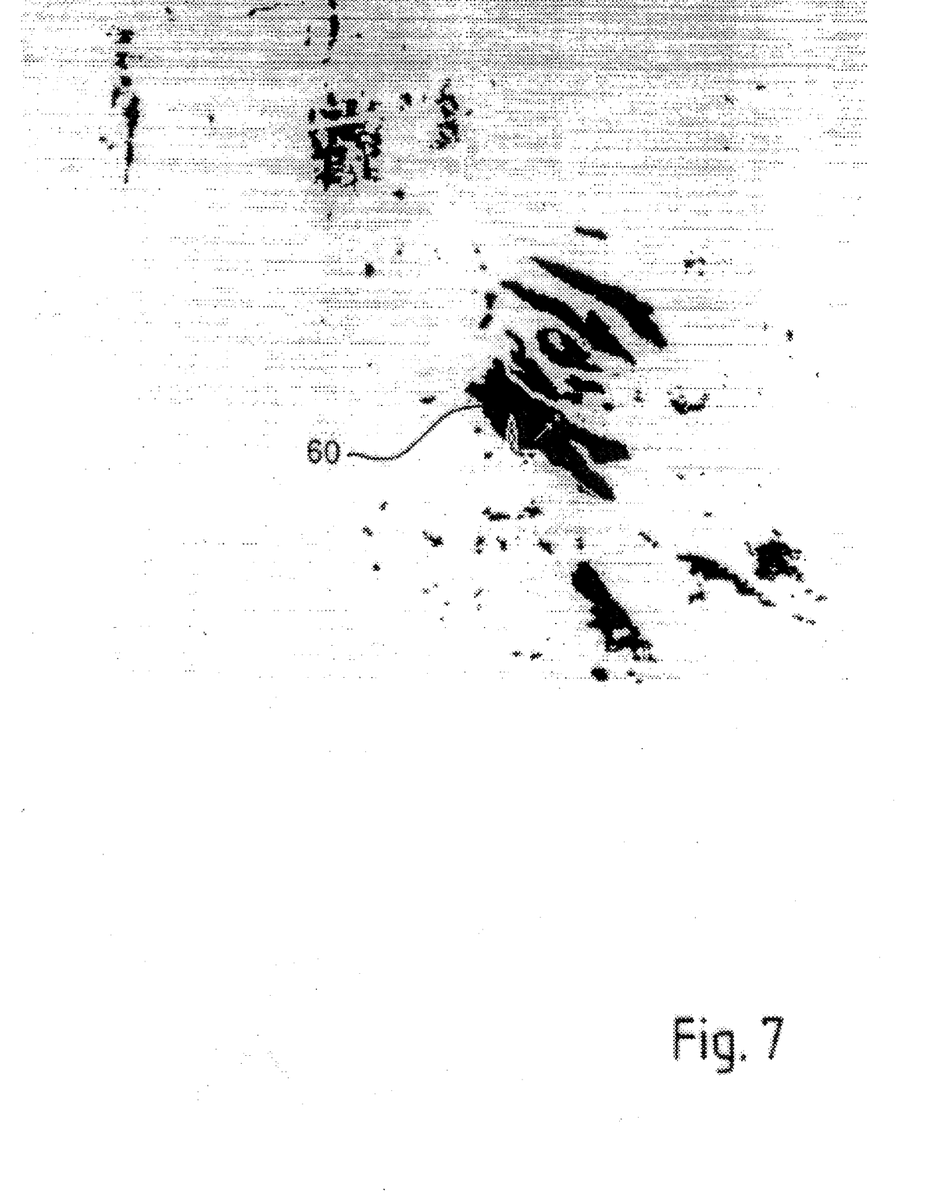
FIG. 7 corresponds to and is derived from FIG. 6 and illustrates hydrocarbon patches of relatively high probability omitting the shading.

The hydrocarbon patches shown in FIG. 7 are derived from the probability map of FIG. 6 by identifying the probability at the edge of the known reserve 60 in FIG. 6 and selecting both patches which have a probability equal to or greater than this probability. The remaining areas are left blank to show the patches in FIG. 7. The known reservoir 60 is shown together with the location of an existing well (illustrated by the oil rig symbol).

Figure 8:
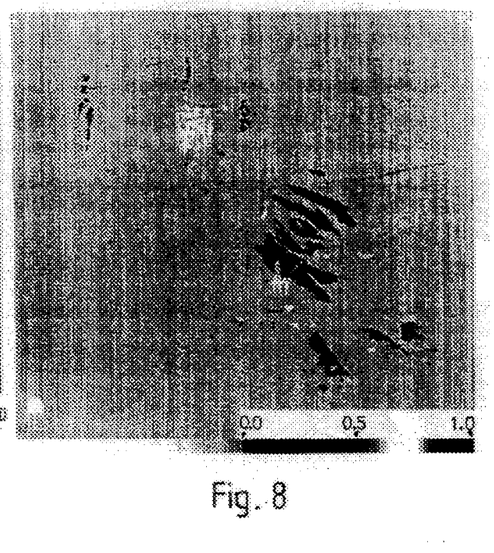
FIG. 8 corresponds to FIG. 7 and shows the same hydrocarbon patches with their costs being indicated by density of shading.
Figure 9:
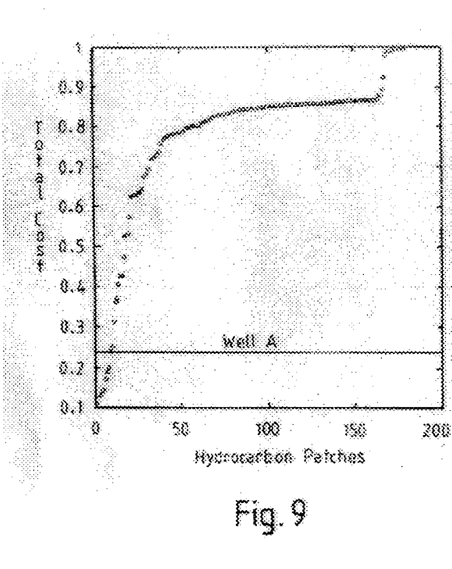
FIG. 9 illustrates graphically the distribution of numbers of patches in FIG. 8 (plotted horizontally) against total cost (plotted vertically)

FIG. 8 shows the same region to a smaller scale but with the total costs, calculated as described hereinbefore, for the patches indicated by density of shading in accordance with the scale at the bottom right of this drawing. FIG. 9 illustrates the distribution of hydrocarbon patches against total cost, where each small circle indicates the number of patches (along the horizontal axis) against the cost of those patches (indicated along the vertical axis). The cost for the known reservoir is indicated by the line "Well A".

Figure 10:
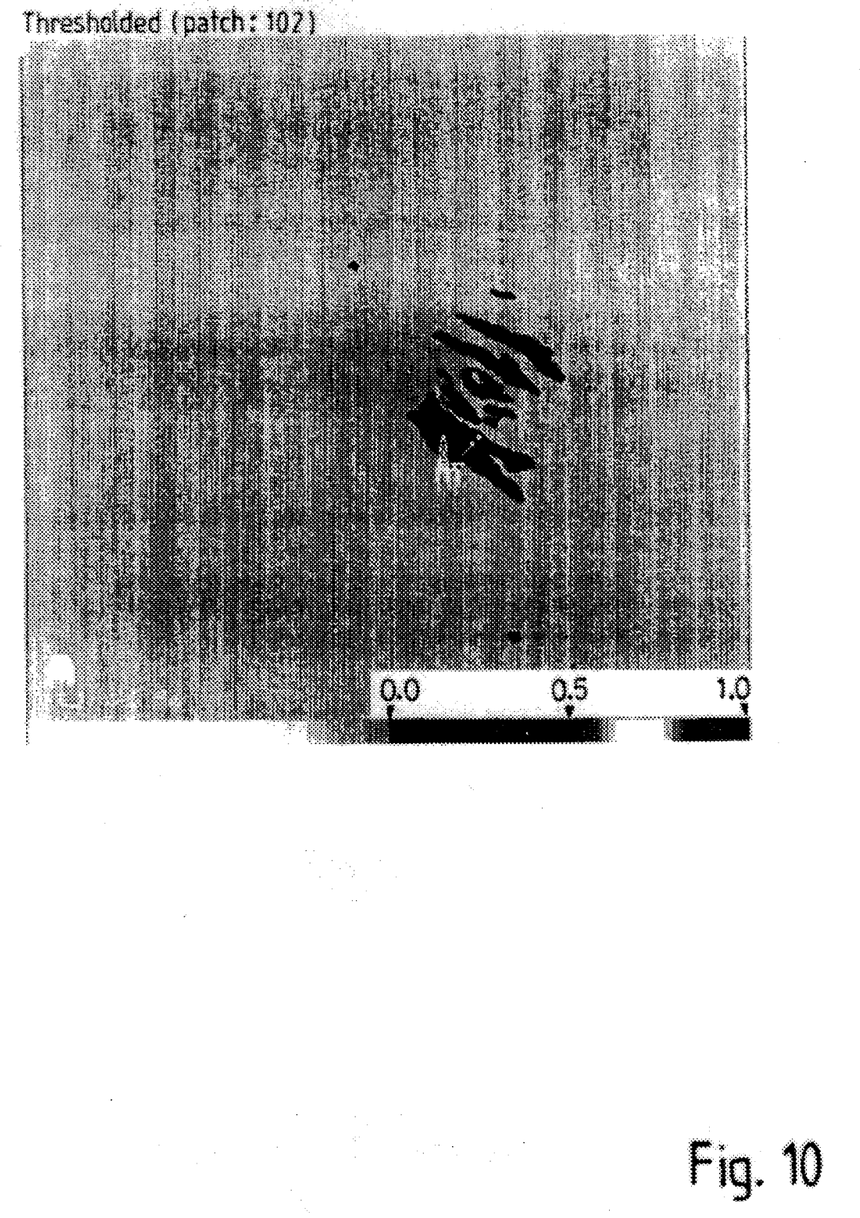
FIG. 10 corresponds to FIG. 8 but shows only those patches whose total costs are less than or equal to that of a known hydrocarbon reserve.

FIG. 10 shows those patches of FIG. 9 which have a cost equal to or less than that of the known reservoir. Surprisingly, a significant number of patches having a lower cost than that of the known reservoir exists. In order to investigate why this should be the case, the individual costs and distributions thereof are shown in FIGS. 11 to 18.

Figure 11:
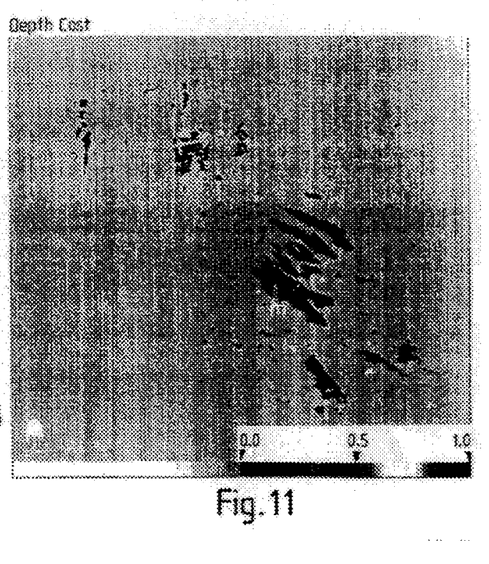
FIGS. 11 and 12 correspond to FIGS. 8 and 9, respectively, but illustrate the depth costs only of the patches.
Figure 12:
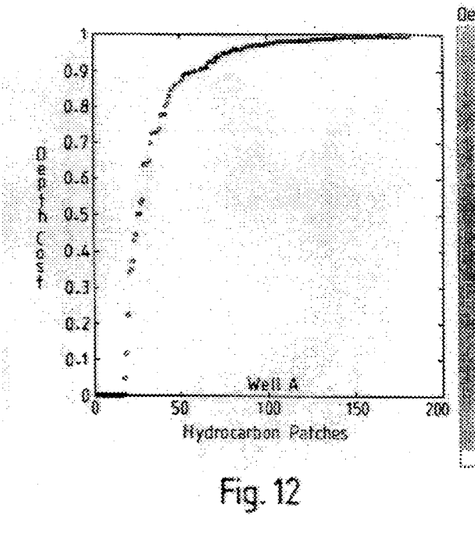

FIG. 11 shows the depth costs of the patches in FIG. 7 and FIG. 12 illustrates the distribution. The depth cost of the known reservoir is substantially equal to zero, which indicates that the depth of the hydrocarbon patch fits substantially exactly the depth of the structural closure enclosing this patch.

Figure 13:
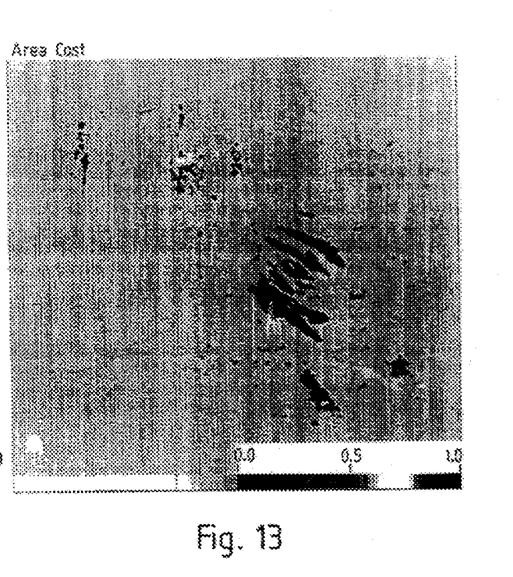
FIGS. 13 and 14 correspond to FIGS. 8 and 9, respectively, but illustrate the area costs only of the patches.
Figure 14:
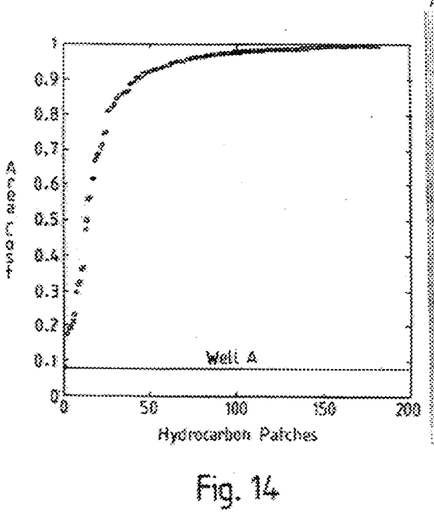

FIGS. 13 and 14 illustrate the area costs of the patches and the distribution thereof. The known reservoir has the lowest area cost indicating that the area of the patch is a good match to that of the corresponding structural closure.

Figure 15:
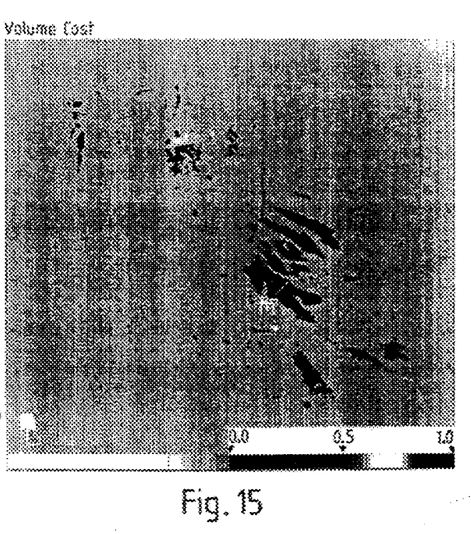
FIGS. 15 and 16 correspond to FIGS. 8 and 9, respectively, but illustrate the volume costs only of the patches.
Figure 16:
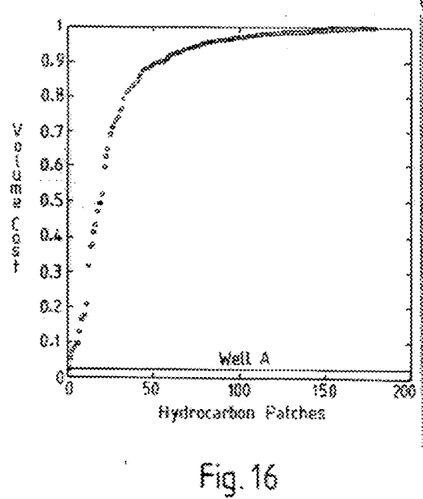

FIGS. 15 and 16 relate to the volume cost. As is indicated in FIG. 16, the cost of the known reservoir is the lowest for all of the patches shown in FIG. 15, thus again indicating a good volume match between the hydrocarbon patch and the structural closure corresponding to it.

Figure 17:
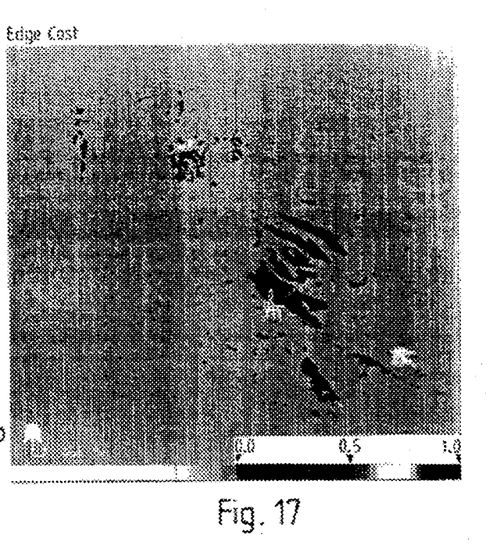
FIGS. 17 and 18 correspond to FIGS. 8 and 9, respectively, but illustrate the edge costs of the patches.
Figure 18:
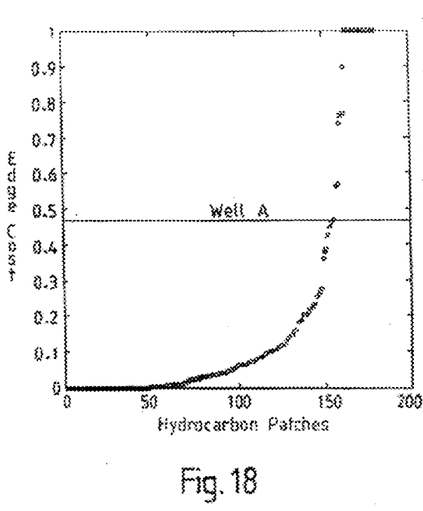

FIGS. 17 and 18 relate to the edge cost and show that the cost of the known reservoir is relatively high. This implies that the edge of the hydrocarbon patch is not a good match to the edge of the corresponding structural closure. This also illustrates why the total cost of the know reservoir as illustrated in FIGS. 7 and 8 is not lower, since the relatively high edge cost has made a substantial contribution to the total cost whereas the other costs are relatively low.

Figure 19:
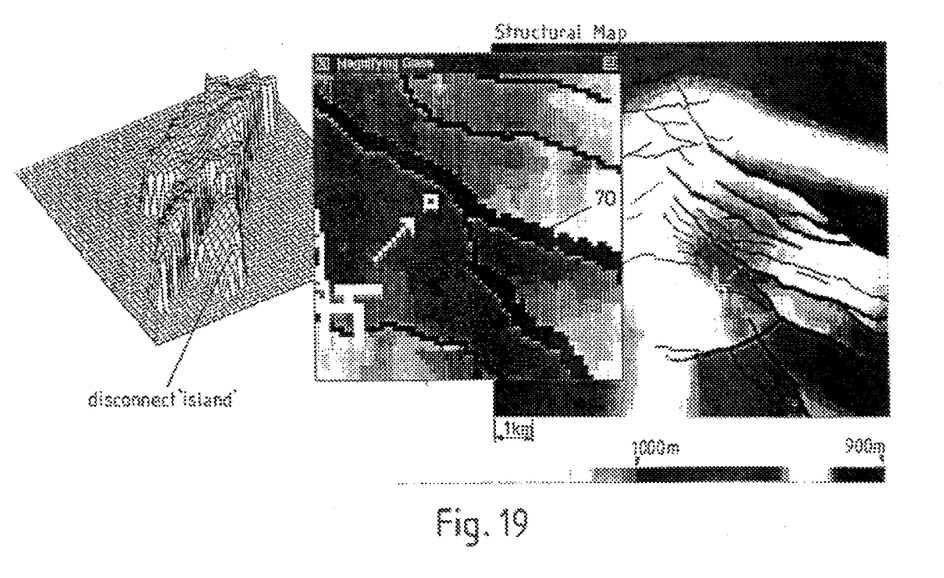
FIG. 19 illustrates by means of a three-dimensional map, a structural map, and a magnified portion of the structural map a refined interpretation of the structure of the known reservoir.

In order to ascertain why the edge cost is so high for the known reservoir, the structure of the structural closure was examined in greater detail and this is illustrated by the three views shown in FIG. 19. Upon closer investigation, it was found that a small fault existed, as indicated at 70 in the magnified view of part of the region. Thus, the structural closure derived from the structural map does not represent a single closure but, instead, represents a main closure and a disconnected "island" as shown in the three-dimensional view in FIG. 19.

Figure 20:
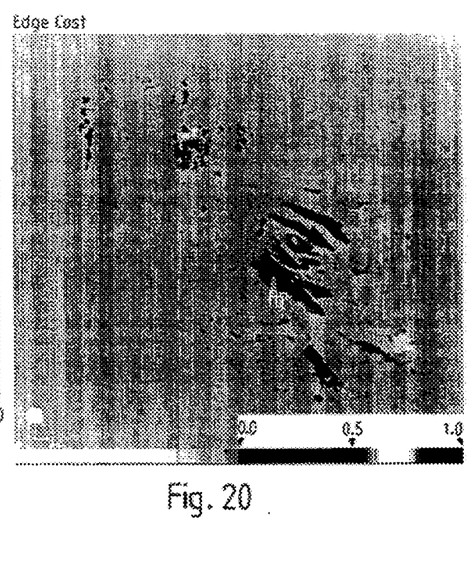
FIGS. 20 and 21 correspond to FIGS. 17 and 18, respectively, but illustrate the edge costs in respect of the refined interpretation of FIG. 19.
Figure 21:
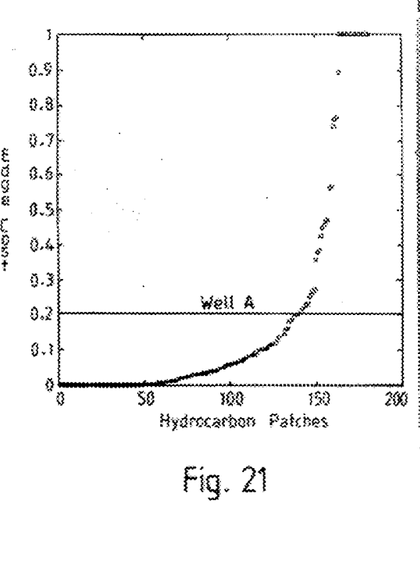

By taking into account the refined interpretation of the structural closure as shown in FIG. 19, the edge cost was calculated again and the results are shown in FIGS. 20 and 21. The edge cost for the known reservoir is thus substantially reduced compared to the original calculation so that a much better match between the hydrocarbon patch and the actual structural closure is obtained. This illustrates one application of the present technique whereby improved knowledge of the structure may be obtained from further investigation of the available data.

Although the invention has been described with respect to specific embodiments thereof, it will be understood that various modifications and variations may be made without departing from the inventive concepts disclosed. All such modifications and variations, therefore, are intended to be included within the spirit and scope of the appended claims.

What is claimed is:

1. A method of locating hydrocarbon reserves comprising:
preparing a hydrocarbon hypothesis map for a region of interest below the surface of the earth, wherein said map represents groups of different pluralities of points used to define a set of possible hydrocarbon containing patches, for all points lying therewithin, the probability of each point containing hydrocarbons;

determining, on the basis of said hydrocarbon hypothesis map, patches each comprising a plurality of graph points having probabilities of containing hydrocarbon reserves greater than a predetermined probability;

defining, from structural data on the region of interest obtained independently of the hydrocarbon hypothesis map and representing depth of earth substrate, a respective structural closure for each of the patches, each structural closure comprising an area capable of enclosing a hydrocarbon reserve and having a perimeter of constant depth substantially equal to the deepest point of the region of interest covered by the patch;

determining a measure of the geometrical difference between each patch and the respective structural closure using geometrical characteristics derived from each of the plurality Of graph points used to define said each patch;

and locating possible hydrocarbon reserves by selecting each patch having a measure of the geometrical difference less than a predetermined measure.

2. A method as defined in claim 1 wherein the measure of the geometrical difference includes a measure of the difference between the vertical height of the patch and the vertical height of the structural closure.

3. A method as defined in claim 1 wherein the measure of the geometrical difference includes a measure of the difference between the area of the patch and the area at the bottom of the structural closure.

4. A method as defined in claim 2 wherein the measure of the geometrical difference includes a measure of the difference between the area of the patch and the area at the bottom of the structural closure.

5. A method as defined in claim 1 wherein the measure of the geometrical difference includes a measure of the difference between the volume of the patch and the volume of the structural closure.

6. A method as defined in claim 2 wherein the measure of the geometrical difference includes a measure of the difference between the volume of the patch and the volume of the structural closure.

7. A method as defined in claim 3 wherein the measure of the geometrical difference includes a measure of the difference between the volume of the patch and the volume of the structural closure.

8. A method as defined in claim 4 wherein the measure of the geometrical difference includes a measure of the difference between the volume of the patch and the volume of the structural closure.

9. A method as defined in claim 1 wherein the measure of the geometrical difference includes a measure of the difference between an outline of the edge of the patch and an outline of the edge of the structural closure.

10. A method as defined in claim 2 wherein the measure of the geometrical difference includes a measure of the difference between an outline of the edge of the patch and an outline of the edge of the structural closure.

11. A method as defined in claim 3 wherein the measure of the geometrical difference includes a measure of the difference between an outline of the edge of the patch and an outline of the edge of the structural closure.

12. A method as defined in claim 4 wherein the measure of the geometrical difference includes a measure of the difference between an outline of the edge of the patch and an outline of the edge of the structural closure.

13. A method as defined in claim 5 wherein the measure of the geometrical difference includes a measure of the difference between an outline of the edge of the patch and an outline of the edge of the structural closure.

14. A method as defined in claim 6 wherein the measure of the geometrical difference includes a measure of the difference between an outline of the edge of the patch and an outline of the edge of the structural closure.

15. A method as defined in claim 7 wherein the measure of the geometrical difference includes a measure of the difference between an outline of the edge of the patch and an outline of the edge of the structural closure.

16. A method as defined in claim 8 wherein the measure of the geometrical difference includes a measure of the difference between an outline of the edge of the patch and an outline of the edge of the structural closure.

17. A method as defined in claim 9 wherein the outline cost is a function of (a) the variance of the depth of a patch outline compared to the average depth of the patch outline, and (b) the expected acceptable variance.

18. A method as defined in claim 10 wherein the outline cost is a function of (a) the variance of the depth of a patch outline compared to the average depth of the patch outline, and (b) the expected acceptable variance.

19. A method as defined in claim 11 wherein the outline cost is a function of (a) the variance of the depth of a patch outline compared to the average depth of the patch outline, and (b) the expected acceptable variance.

20. A method as defined in claim 12 wherein the outline cost is a function of (a) the variance of the depth of a patch outline compared to the average depth of the patch outline, and (b) the expected acceptable variance.

21. A method as defined in claim 13 wherein the outline cost is a function of (a) the variance of the depth of a patch outline compared to the average depth of the patch outline, and (b) the expected acceptable variance.

22. A method as defined in claim 14 wherein the outline cost is a function of (a) the variance of the depth of a patch outline compared to the average depth of the patch outline, and (b) the expected acceptable variance.

23. A method as defined in claim 15 wherein the outline cost is a function of (a) the variance of the depth of a patch outline compared to the average depth of the patch outline, and (b) the expected acceptable variance.

24. A method as defined in claim 16 wherein the outline cost is a function of (a) the variance of the depth of a patch outline compared to the average depth of the patch outline, and (b) the expected acceptable variance.

* * * * *